(12) United States Patent
Chen

(10) Patent No.: US 7,172,281 B2
(45) Date of Patent: Feb. 6, 2007

(54) PROTECTIVE CUSHION ATTACHED TO EYEGLASSES

(76) Inventor: How-Lung Chen, P.O. Box 90, Tainan City 70499 (TW)

( * ) Notice: Subject to any disclaimer, the term of this patent is extended or adjusted under 35 U.S.C. 154(b) by 1 day.

(21) Appl. No.: 11/166,130

(22) Filed: Jun. 27, 2005

(65) Prior Publication Data
US 2006/0158607 A1    Jul. 20, 2006

(30) Foreign Application Priority Data
Jan. 19, 2005    (TW) .............................. 94112510 A

(51) Int. Cl.
*G02C 11/08*    (2006.01)

(52) U.S. Cl. .................... 351/62; 351/132; 351/158

(58) Field of Classification Search .................. 351/41, 351/62, 83, 158, 44, 132; 2/435–437
See application file for complete search history.

(56) References Cited

U.S. PATENT DOCUMENTS

| | | | |
|---|---|---|---|
| 4,382,440 A * | 5/1983 | Kapp et al. ............. | 128/201.25 |
| 4,405,212 A * | 9/1983 | Cooper ........................ | 351/43 |
| 4,785,481 A * | 11/1988 | Palmer et al. .................. | 2/436 |
| 2006/0072065 A1* | 4/2006 | Fernandez et al. ............ | 351/41 |

* cited by examiner

*Primary Examiner*—Huy Mai

(57) ABSTRACT

A protective cushion attached to eyeglasses comprises at least one first fastener piece attached on the inner surface around the eye portions of an eyeglass frame and at least one cushion piece corresponding to the first fastener piece. The cushion piece is provided with a second fastener piece, which cushion piece is a sponge body enclosed by gas permeable cloth. The cushion piece will be attached onto the inner surface around the eye portions of the eyeglass frame for reducing the harm to eyes and the surrounding portions due to an external impact on the eyeglass frame and for keeping the skin in contact of the protective cushion dry and free from eczema. Further, the cushion piece is easy to replace.

2 Claims, 7 Drawing Sheets

PROTECTIVE CUSHION ATTACHED TO EYEGLASSES

BACKGROUND OF THE INVENTION

1. Field of the Invention

The present invention relates to protective cushions attached to eyeglasses, more particularly to a protective cushion comprising at least one first fastener piece attached on the inner surface around the eye portions of an eyeglass frame and at least one cushion piece corresponding to the first fastener piece. The cushion piece is provided with a second fastener piece, which cushion piece is a sponge body enclosed by gas permeable cloth. The cushion piece will be attached onto the inner surface around the eye portions of the eyeglass frame for reducing the harm to eyes and the surrounding portions due to an external impact on the eyeglass frame and for keeping the skin in contact of the protective cushion dry and free from eczema. Further, the cushion piece is easy to replace.

2. Description of the Prior Art

As a hard eyeglass frame of a pair of eyeglasses is punched by an external force, the eyeglass frame may cause harm to the eyes and the surrounding portions of the user. Therefore, an eyeglass frame with protective cushion was invented, as shown in FIG. 2, which has a cushion piece 11 made of sponge attached to the inner surface around the eye portions of an eyeglass frame 10 of a pair of eyeglasses 1, whereby harm to the eyes due to an external impact will be prevented. However, the protective cushion attached to eyeglasses of the prior art has at least the following disadvantages: (1) that the sponge body of the protective cushion has low air permeability and therefore may cause eczema to the skin in contact with the cushion; and (2) that the cushion piece 11 of the protective cushion is permanently attached to eyeglasses and cannot be replaced.

SUMMARY OF THE INVENTION

The primary objective of the present invention is to provide a protective cushion attached to eyeglasses that is easily replaceable and of effective gas permeability.

Accordingly, the first preferred embodiment of the present invention is a protective cushion attached to eyeglasses comprising a pair of first fastener pieces attached on the inner surface around the eye portions of an eyeglass frame and a pair of cushion pieces respectively corresponding to the first fastener pieces, each of the cushion pieces being provided with a second fastener piece and being a sponge body enclosed by gas permeable cloth.

The second preferred embodiment of the present invention is a protective cushion attached to eyeglasses comprising a single first fastener piece attached on the inner surface around the eye portions of an eyeglass frame and a single cushion piece corresponding to the first fastener piece, which cushion piece is provided with a second fastener piece and is a sponge body enclosed by gas permeable cloth.

DETAILED DESCRIPTION OF THE PREFERRED EMBODIMENTS

The various objects and advantages of the present invention will be more readily understood from the following detailed description when read in conjunction with the appended drawings.

Figure 1:
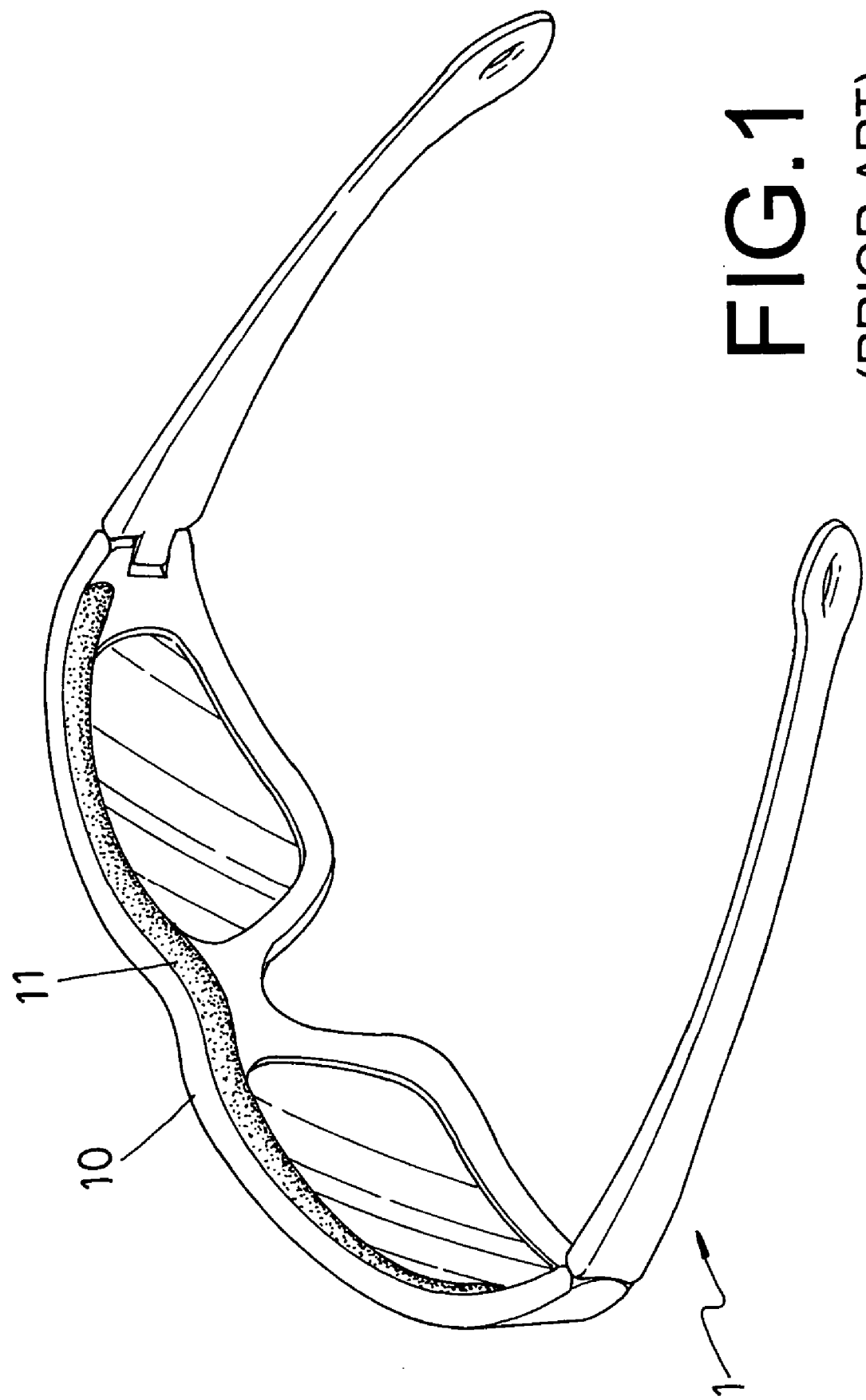
FIG. 1 is a perspective view of a protective cushion attached to eyeglasses of the prior art.
Figure 2:
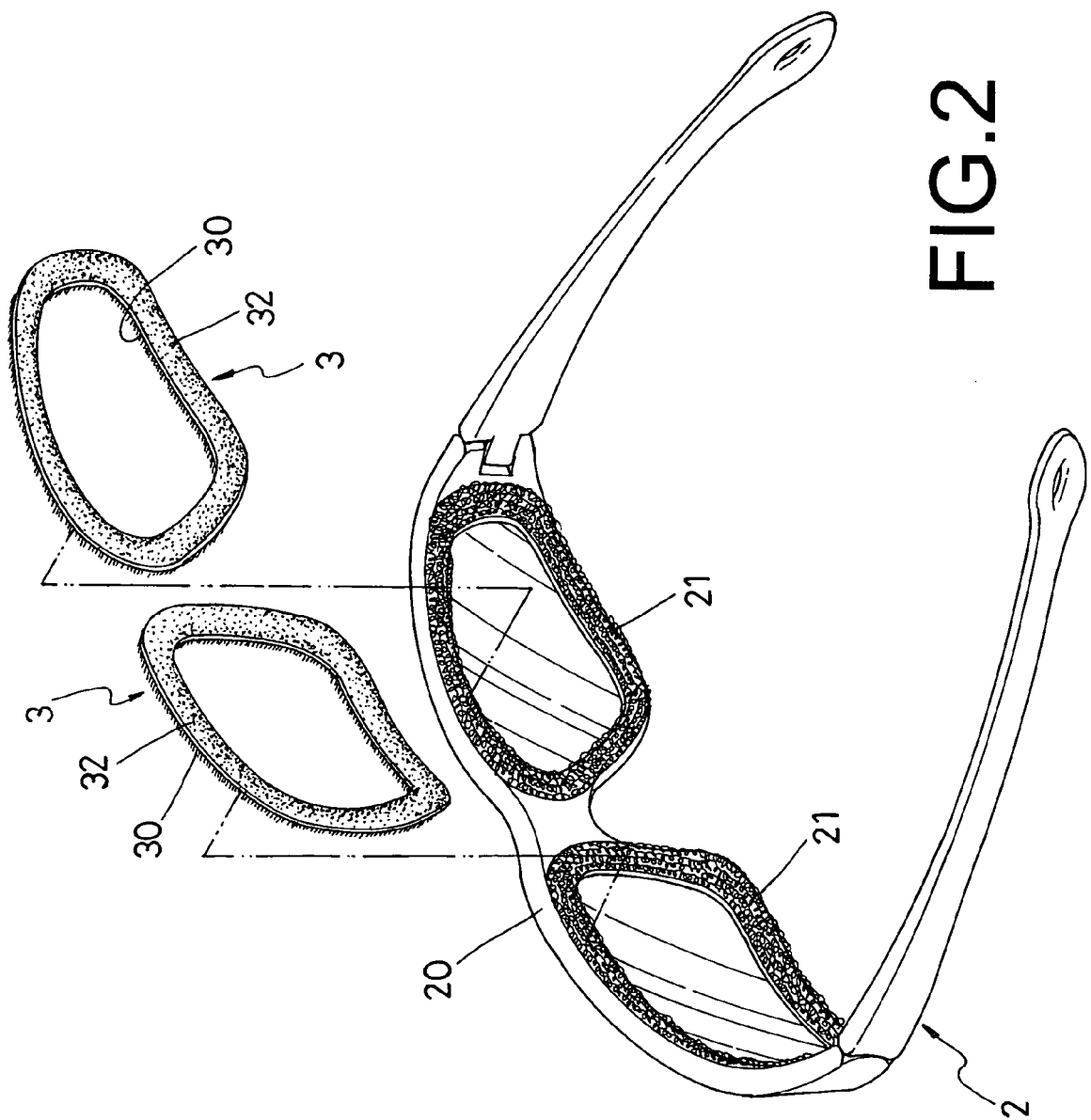
FIG. 2 is an exploded perspective view of the first preferred embodiment of the present invention as a protective cushion attached to eyeglasses.
Figure 4:
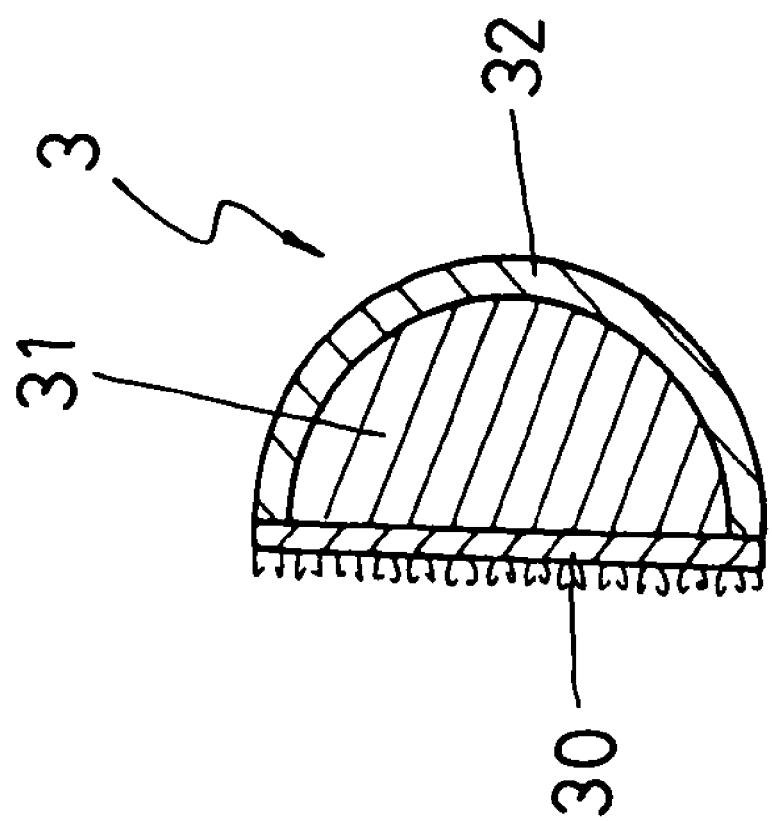
FIG. 4 is a lateral cross-sectional view of the first preferred embodiment of the present invention.

Referring to FIG. 2 and 4, a protective cushion attached to eyeglasses according to the present invention comprises a pair of fastener pieces 21 attached on the inner surface of an eyeglass frame 20 of the eyeglasses 2 and a pair of cushion pieces 3 respectively corresponding to the fastener pieces 21. Each of the cushion pieces 3 is provided with a fastener piece 30, which cushion pieces are each a sponge body 31 enclosed by gas permeable cloth 32. Each fastener piece 21 is a closed loop and the two first fastener pieces 21 are not connected to each other. Each cushion fastener piece 3 is a closed loop and the two cushion pieces 3 are not connected to each other. The fastener piece 30 is at a lower side and the gas permeable cloth 32 is at an upper side; and the sponge body 31 is received in a space enclosed by the fastener piece 30 and the gas permeable cloth 32.

Figure 3:
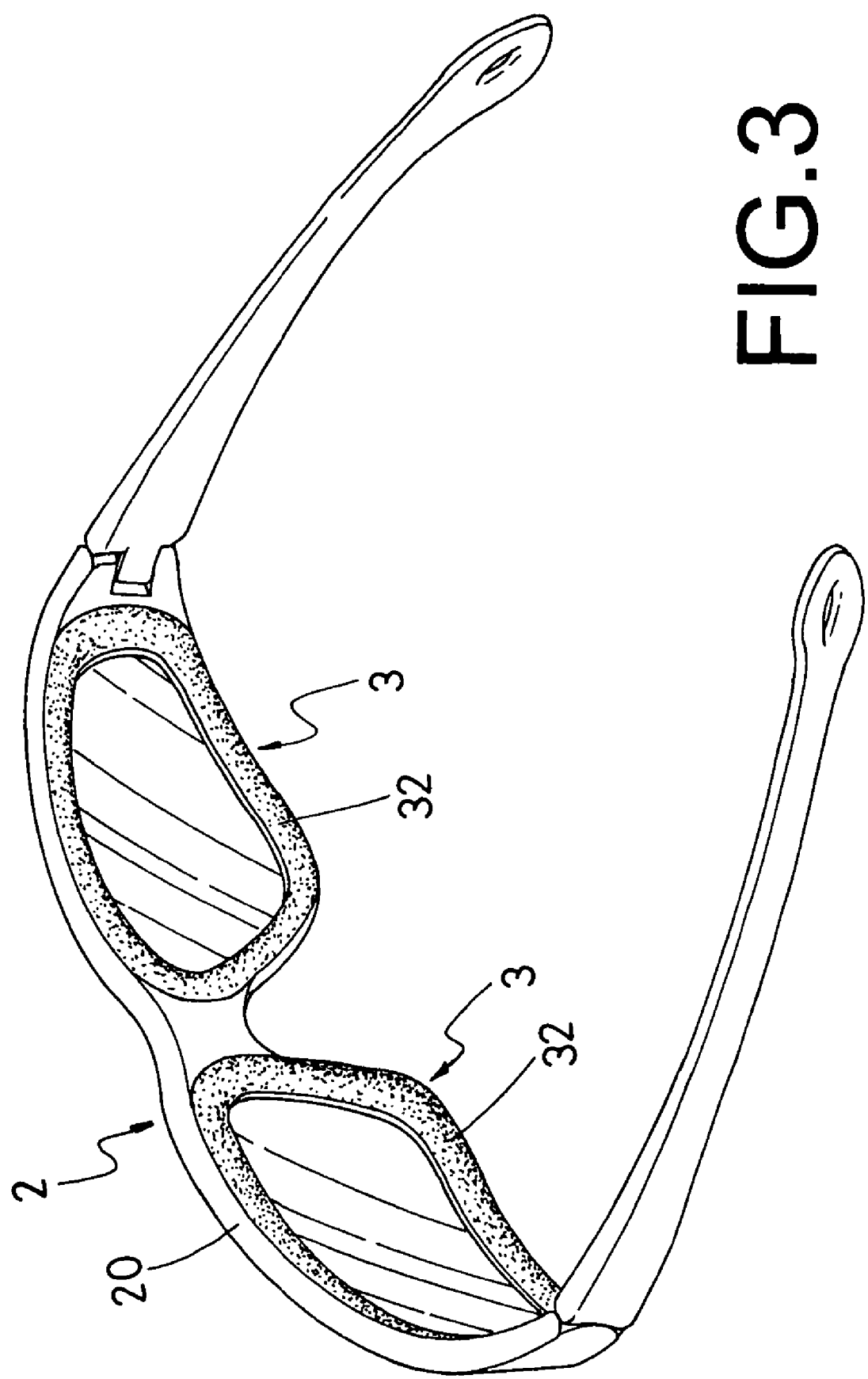
FIG. 3 is a perspective view of the first preferred embodiment of the present invention.

Please refer to FIG. 2, 3 and 4 for the use of the protective cushion attached to eyeglasses. Each of the fastener pieces 30 of the cushion pieces 3 is coupled with a corresponding fastener piece 21 on the eyeglass frame 20, whereby the cushion pieces 3 will be attached onto the inner surface around the eye portions of the eyeglass frame 20. Therefore, the installation of the protective cushion is completed. By means of the cushion pieces 3, the harm to eyes and the surrounding portions due to an external impact on the eyeglass frame 20 can be significantly reduced. Further, the gas permeable cloth 32 of the cushion pieces 3 will promote perspiration and air ventilation, whereby the skin in contact of the protective cushion may keep dry and be free from eczema. To replace either of the cushion pieces 3, a cushion piece 3 can be easily removed from the eyeglass frame 20, and a new cushion piece 3 can be installed in the same way described above.

Figure 5:
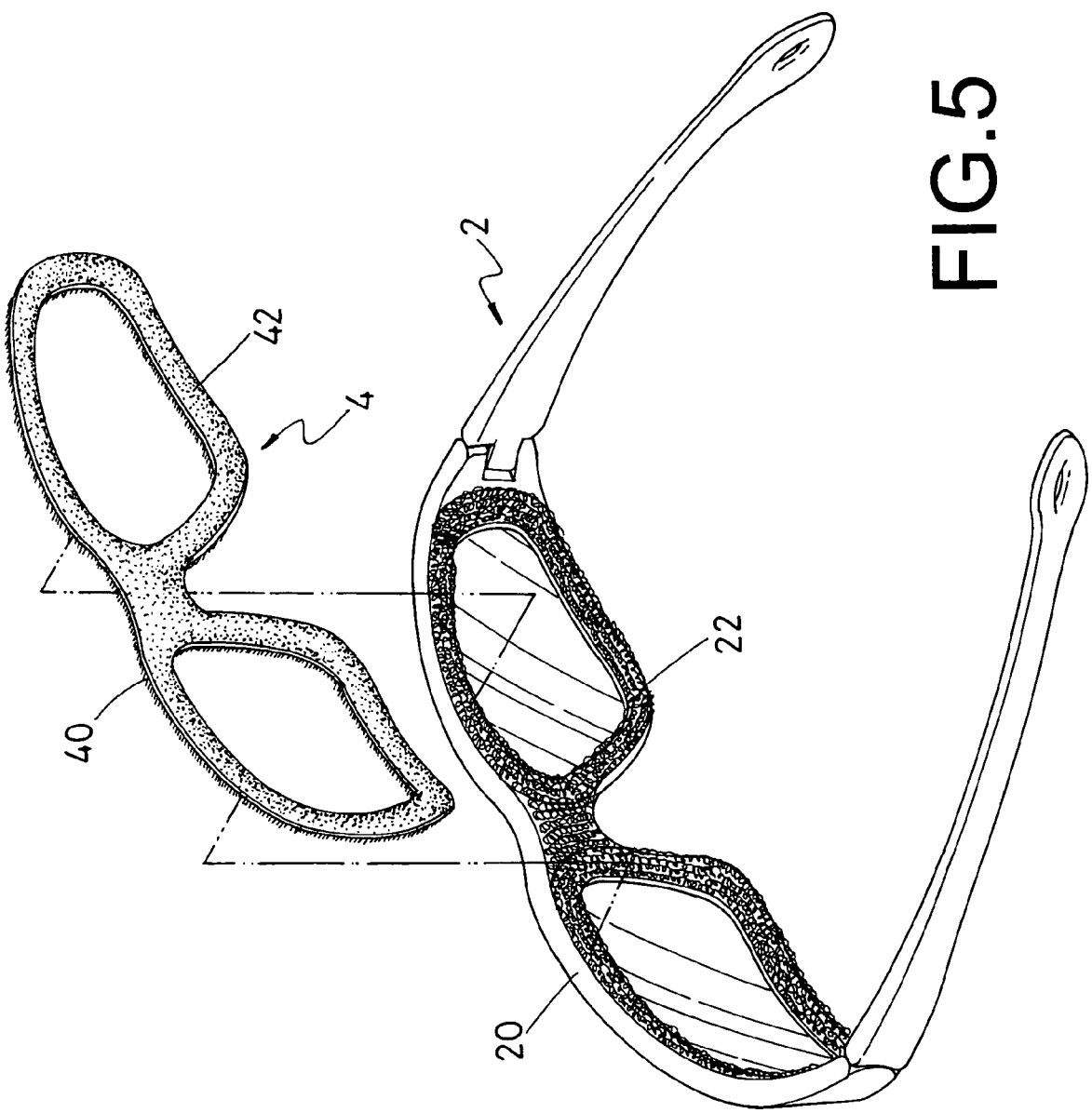
FIG. 5 is an exploded perspective view of the second preferred embodiment of the present invention as a protective cushion attached to eyeglasses.
Figure 6:
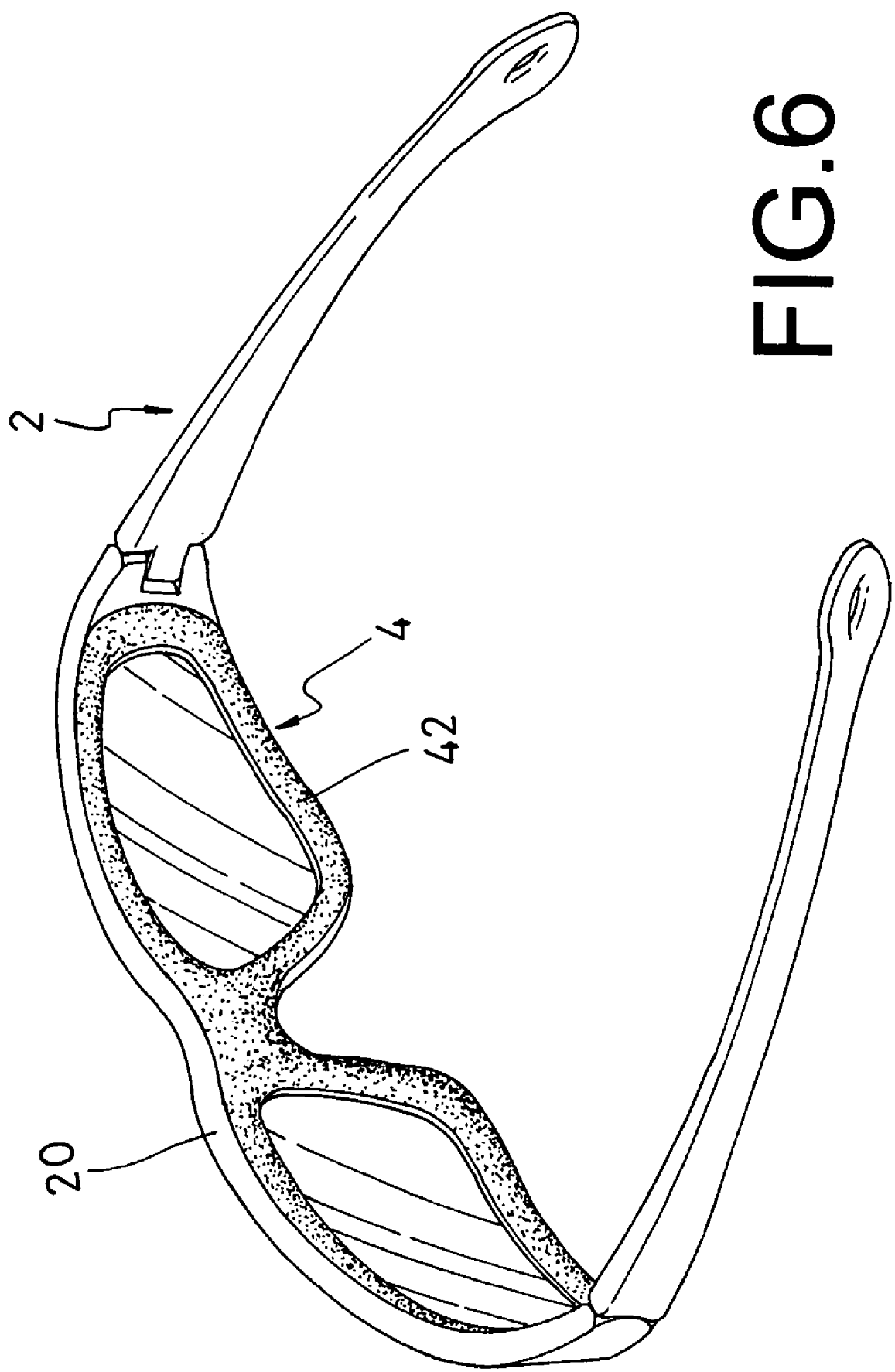
FIG. 6 is a perspective view of the second preferred embodiment of the present invention.
Figure 7:
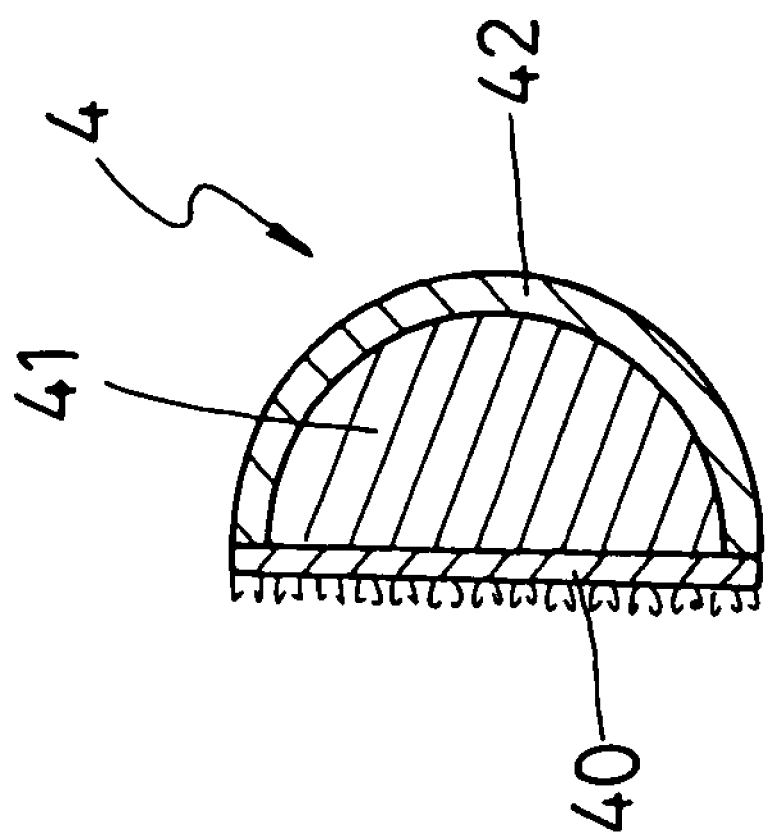
FIG. 7 is a lateral cross-sectional view of the second preferred embodiment of the present invention.

Please refer to FIG. 5, 6 and 7 for another preferred embodiment of the present invention. The preferred embodiment comprises a single fastener piece 22 attached on the inner surface of an eyeglass frame 20 and a single cushion piece 4 corresponding to the fastener piece 22. The cushion piece 4 is provided with a fastener piece 40, which cushion piece is a sponge body 41 enclosed by gas permeable cloth 42. The first fastener piece 22 is formed by two close boys which are connected by a stripe across a ridge portion of an eyeglass; and the cushion piece 4 is shaped to be corresponding to the fastener piece 22. The cushion piece 4 is formed by two close boys which are connected by a stripe across a ridge portion of an eyeglass. The cushion portion 4 is provided with the second fastener piece 40 at an upper side thereof and the gas permeable cloth at a lower side thereof. The sponge body 41 is enclosed by the fastener piece 40 and the gas permeable cloth 42. To use this preferred embodiment, the fastener piece 40 of the cushion piece 4 is coupled with the fastener piece 22 on the eyeglass frame 20, whereby the cushion piece 4 will be attached onto the inner surface around the eye portions of the eyeglass frame 20, By means of the cushion piece 4, the harm to eyes and the surrounding portions due to an external impact on the eyeglass frame 20 can be significantly reduced. Further, the gas permeable cloth 42 of the cushion piece 4 will promote perspiration and air ventilation, whereby the skin in contact of the protective cushion may keep dry and be free from eczema. To replace the cushion piece 4, it is easily removed from the eyeglass frame 20, and a new cushion piece can be installed in the same way described above.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A protective cushion attached to eyeglasses, comprising:

a pair of first fastener pieces attached on an inner surface around eye portions of an eyeglass frame, each first fastener piece being a closed loop and the two first fastener pieces being not connected to each other; and a pair of cushion pieces respectively corresponding to said first fastener pieces, each cushion fastener piece being a closed loop and the two cushion pieces being not connected to each other; each of said cushion pieces being provided with a second fastener piece at a lower side, and a gas permeable cloth at an upper side; a sponge body being filled in a space enclosed by said second fastener pieces and said gas permeable cloth.

2. A protective cushion attached to eyeglasses, comprising:

a first fastener piece attached on an inner surface around eye portions of an eyeglass frame, wherein the first fastener piece is formed by two close loops which are connected by a stripe across a ridge portion of an eyeglass; and a cushion piece corresponding to said first fastener piece, said cushion piece being formed by two close loops which are connected by a stripe across a ridge portion of an eyeglass; said cushion portion being provided with a second fastener piece at an upper side thereof and a gas permeable cloth at a lower side thereof; a sponge body being enclosed by the gas permeable cloth.

* * * * *